United States Patent
Cortes-Fargas et al.

(10) Patent No.: US 11,661,194 B2
(45) Date of Patent: May 30, 2023

(54) POWER TRANSMISSION SYSTEM

(71) Applicant: AIRBUS HELICOPTERS DEUTSCHLAND GMBH, Donauworth (DE)

(72) Inventors: Marc Cortes-Fargas, Barcelona (ES); Wouter Beckers, Taufkirchen (DE); Juergen Fischer, Augsburg (DE); Thomas Kellner, Bogen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 635 days.

(21) Appl. No.: 16/704,432

(22) Filed: Dec. 5, 2019

(65) Prior Publication Data

US 2020/0290851 A1  Sep. 17, 2020

(30) Foreign Application Priority Data

Mar. 14, 2019  (EP) ..................................... 19400010

(51) Int. Cl.
*B64D 1/22* (2006.01)
*B66D 3/22* (2006.01)
*B66D 3/26* (2006.01)

(52) U.S. Cl.
CPC ................. *B64D 1/22* (2013.01); *B66D 3/22* (2013.01); *B66D 3/26* (2013.01)

(58) Field of Classification Search
CPC ... B66D 3/20; B66D 3/22; B66D 3/26; B66D 1/22; B64C 1/22; B66C 23/18
See application file for complete search history.

(56) References Cited

U.S. PATENT DOCUMENTS

| | | | | |
|---|---|---|---|---|
| 2,734,645 A | * | 2/1956 | Petersen | B64C 1/22 414/743 |
| 3,088,608 A | * | 5/1963 | Theodore | B64D 1/22 212/75 |
| 3,380,688 A | * | 4/1968 | Adams | B64D 1/22 244/17.11 |
| 4,113,207 A | * | 9/1978 | Dalziel | B64D 1/22 441/83 |
| 4,188,000 A | * | 2/1980 | Dalziel | B64D 1/22 182/138 |

(Continued)

FOREIGN PATENT DOCUMENTS

DE   102013106388 A1   10/2014
RU      2245819 C1    2/2005

OTHER PUBLICATIONS

European Search Report for European Application No. EP 19400010. 5, Completed by the European Patent Office, dated Jul. 29, 2019, 10 pages.

*Primary Examiner* — Sang K Kim
*Assistant Examiner* — Nathaniel L Adams
(74) *Attorney, Agent, or Firm* — Brooks Kushman P.C.

(57) ABSTRACT

A power transmission system that is adapted to transmit forces from a motor to a component comprises an externally threaded shaft 551 that is rotatably attached to the motor, an internally threaded fastener that is movably attached to the externally threaded shaft, a first element, and a second element that is movably attached to the first element at a second joint and that is rigidly attached to the component at a third joint.

20 Claims, 7 Drawing Sheets

(56) References Cited

U.S. PATENT DOCUMENTS

| | | | | |
|---|---|---|---|---|
| 4,750,691 | A * | 6/1988 | Hollrock | B64C 1/22 |
| | | | | 244/137.1 |
| 5,190,250 | A * | 3/1993 | DeLong | B64D 1/22 |
| | | | | 244/17.11 |
| 5,209,435 | A * | 5/1993 | Edwards | B61B 12/005 |
| | | | | 105/8.1 |
| 5,375,795 | A * | 12/1994 | Strunk | B64D 1/22 |
| | | | | 441/83 |
| 6,027,103 | A * | 2/2000 | Painter | B66D 1/7415 |
| | | | | 254/362 |
| 6,334,590 | B1 * | 1/2002 | Landry | B64D 1/22 |
| | | | | 244/137.1 |
| 6,651,775 | B2 * | 11/2003 | Bassett, Jr. | B66F 11/042 |
| | | | | 182/69.5 |
| 7,070,059 | B1 * | 7/2006 | Flowers | B66C 23/44 |
| | | | | 414/921 |
| 8,052,090 | B1 * | 11/2011 | Nelson | B66D 3/20 |
| | | | | 244/137.4 |
| 2011/0147531 | A1 * | 6/2011 | Bosqueiro | B66D 3/20 |
| | | | | 244/137.1 |
| 2015/0208805 | A1 * | 7/2015 | Griggs, Jr. | A47C 7/00 |
| | | | | 74/89 |
| 2020/0290851 | A1 * | 9/2020 | Cortes-Fargas | B64D 1/22 |

* cited by examiner

POWER TRANSMISSION SYSTEM

CROSS-REFERENCE TO RELATED APPLICATIONS

This application claims priority to European patent application No. EP 19400010.5 filed on Mar. 14, 2019, the disclosure of which is incorporated in its entirety by reference herein.

BACKGROUND OF THE INVENTION

(1) Field of the Invention

The present embodiments relate to a power transmission system that is adapted to transmit forces from a motor to a component and, more particularly, to a power transmission system for transmitting forces from a motor to a boom with a hoist device, whereby the power transmission system is attached to an aircraft.

(2) Description of Related Art

For cargo, rescue, tactical or similar missions, some aircrafts are provided with hoist or lift mechanisms. Classically, such a hoist or lift mechanism has a boom that is secured to the fuselage of the aircraft with an external system. The hoist may include a winch mechanism that is fixed to the boom and a rope/cable attached to the winch mechanism so as to be unwound from or wound into the winch mechanism to respectively descend or ascend. Generally, a load carrying harness is secured to the rope/cable. Thus, people and/or objects can be moved by the mechanism while being attached to the load carrying harness.

As a result of their hovering ability, rotary wing aircrafts may be especially suitable for such cargo, rescue, tactical or the like missions. In many rotary wing aircrafts, the hoist mechanism is located above an access opening provided in the fuselage. This access opening allows people or objects to enter and exit the fuselage. Depending on the requirements of the mission and on the architecture of these rotary wing aircrafts, the opening access may be a side door, a rear door or a movable panel, a floor trap or the like.

In a conventional rescue hoist mechanism, it is quite challenging to control the position of the rescue hoist. Moving the helicopter airframe to control the position of the rescue hoist may be a major obstacle in rescue activities that are often required to be fast and accurate.

Document U.S. Pat. No. 8,052,090 B1 describes a support system that attaches a hoist to the external stores support system of an aircraft by using a boom from which a first leg depends and is attached to a forward fitting. A second leg is attached to the boom via a collar and attaches to an aft fitting while a torque arm is pivotally attached to the collar via a support arm, the torque arm also attaches to a tie-down fitting. The legs are attached to their respective fittings using pins and the torque arm is bolted to the tie-down ring fitting. A hoist slip having a horn is attached to an end of the boom.

Document RU 2245819 C1 describes an on-board loading unit for helicopters that includes a swivel strut with devices for an articulated joint between the floor and the ceiling inside the fuselage in the area of the door aperture. A boom is rigidly secured on the strut and a winch is mounted on the strut with a rope running to the roller that is fitted on the end of the boom and provided with a load hook. A fixed beam of the boom is secured on the strut on the side of the brackets that form a tail cantilever. Fixed and movable beams of the boom are made in the form of a telescopic system consisting of rectangular beams with bearing rollers for a movable beam. The boom is provided with a hydraulic drive whose cylinder is secured on a fixed beam and the rod is connected with a movable beam. The winch is secured on a swivel platform mounted on the lower part of the strut for locking it in two positions. The end of the tail cantilever is provided with an additional roller and two additional rollers with reeving systems are mounted on the upper part of the strut for motion of the cargo inside the fuselage by means of a winch.

Document U.S. Pat. No. 6,334,590 B1 describes a removable hoisting apparatus for use on an aircraft to hoist cargo and people into the aircraft. The removable hoisting apparatus comprises a base member, a telescoping mast member, a boom member, and a hoist assembly carried by the boom member. The base member is of negligible weight and is adapted for attachment to the floor of the aircraft. The telescoping mast has a bottom portion and a top portion. The bottom portion is releasably connected to the base member, and the top portion is releasably connected to the bottom portion. The top portion extends through an opening in the aircraft. A shoulder member is connected to the top portion, and a boom member is connected to the shoulder member. A rigid link member connects the boom member to the aircraft. The removable hoisting apparatus can be quickly removed from the aircraft by releasing only three quick-release fasteners, leaving only the base member attached to the aircraft.

Document U.S. Pat. No. 4,750,691 A describes a hoist that is provided for an aircraft, such as a helicopter or VTOL, capable of hovering flight and having a boom pivotally connected to the structural frame of the aircraft for movement between retracted and extended positions. A cable powered by a winch is engaged with the boom and is used with the extended boom for conventional hoisting operations. The arrangement of the cable guide pulleys relative to the pivot axis of the boom and the operation of the winch control system is such that the cable and winch are additionally usable to effect movement of the boom between its retracted and extended positions thereby eliminating the need for a separate boom extending and retracting motor.

However, most of the current solutions provide a support system for connecting a hoist to an aircraft, possibly combined with a support arm that is rigidly attached to a boom of the aircraft and a torque arm that is pivotally attached to the support arm. These solutions move the hoist along a single axis. However, for providing free movement in a plane, these solutions need high torque under dynamic and static loads.

Document US 2015/0208805 A1 describes a motor assembly for reclining furniture. The motor assembly includes a motor having one or more first fittings that correspond to one or more second fittings comprised within reclining furniture actuation mechanism. The first and second fittings are configured to be mutually connectable without tools or fastener. The motor which drives a screw is mounted to one side of a slide rail, to which a trolley is slidably engaged. The rotation of the screw causes the trolley to move along the slide rail. The trolley is pivotally coupled to respective ends of a pair of swings arms. The opposite ends of the swing arms are connected to a transverse, elongated linkage member.

Document DE 10 2013 106388 B3 describes an adjusting mechanism for the adjustment of movable furniture parts, consisting of a linear actuator with a drive motor and a rotatable threaded spindle with a spindle nut that is mounted in a cladding tube, and a slider that is coupled the with the spindle nut in motion and coupled via a lever mechanism with an adjusting means for a furniture part. A bearing block is fixed on the upper side of the slider and projecting therefrom, on which a first end of a lever forming a pivot lever is articulated and the second end of the pivot lever is articulated to a bearing bracket which is attached to the adjusting means for the furniture part.

BRIEF SUMMARY OF THE INVENTION

Based on the limitations and drawbacks of the prior art, an objective is to provide a power transmission system that is adapted for transmitting forces from a motor to a component (e.g., an external load device). The power transmission system should be easily, quickly and smoothly detachable from the fuselage when needed in view of a forthcoming mission.

The power transmission system should also be as light as possible to be usable in aircrafts. Furthermore, the power transmission system should be as reliable, structurally simple, and functional as possible, in particular under elastic deformations, static, and/or dynamic loads. Moreover, the power transmission system should provide the possibility of freely moving the component in a two-dimensional plane.

This objective is solved by an apparatus comprising the features of claim 1.

More specifically, a power transmission system that is adapted to transmit forces from a motor that generates a first rotational movement to a component comprises an externally threaded shaft, an internally threaded fastener, a first element, and a second element. The externally threaded shaft is configured to be rotatably attached to the motor and performs a second rotational movement. The internally threaded fastener is movably attached to the externally threaded shaft and performs a movement along the externally threaded shaft in response to the second rotational movement. The first element comprises a first end that is movably attached to the internally threaded fastener at a first joint, and a second end. The second element comprises a plateau having a first end and a second end. The first end is movably attached to the second end of the first element at a second joint and the second end is adapted to be rigidly attached to the component at a third joint. The first element transmits the forces from the first joint to the second joint. The plateau transmits the forces from the second joint to the third joint by transforming a rotational movement of the second joint into a rotation of the component.

According to some embodiments, the power transmission system may include a motor and a gearbox. The motor and the gearbox may turn a spindle.

According to some embodiments, a nut may move along the spindle.

According to some embodiments, a guide may be attached to the nut to prevent the action of forces in directions that are not in the axis of the spindle. If desired, the guide must not necessarily be a separate component, but may be implemented as part of another component such as a housing, for example.

According to some embodiments, a rod may be attached to the nut. The rod may be attached to a plateau that creates a rotary movement in a component.

According to some embodiments, a beam may be attached to the component, which is used to reel an external load device in or out of an aircraft.

According to some embodiments, the power transmission system may be used in an aircraft and may expand mainly in a plane that is perpendicular to the height of the aircraft.

According to some embodiments, in the scenario of a need for a high-performance component, the power transmission system may be enlarged along the plane of the aircraft.

According to some embodiments, the power transmission system may allow to use a smaller gearbox and/or a smaller motor.

According to some embodiment, the power transmission system may provide high performance with smaller volume and weight.

According to some embodiments, the power transmission system may provide high torque for a rotational movement of the beam.

According to some embodiments, the power transmission system may provide a good compromise between torque to the beam and weight.

According to some embodiments, the power transmission system may include a guide bracket.

According to some embodiments, the guide bracket may be attached to the internally threaded fastener.

According to some embodiments, the power transmission system may be easily adapted to different aircrafts and for different operations.

According to some embodiments, the power transmission system may provide a modularity and a scalability perpendicular to the height of the aircraft.

According to some embodiments, the power transmission system may include elements that are cost-efficient and mass production elements.

According to some embodiments, the power transmission system may include commercial off-the-shelf parts.

According to some embodiments, the power transmission system may be used at the outside of a vehicle.

According to some embodiments, the power transmission system may be formed in an aerodynamic shape that reduces a total drag of the vehicle.

According to some embodiments, the power transmission system may operate under a deflection that occurs because of high load.

According to some embodiments, the power transmission system may be used in high precision applications with a smaller externally threaded shaft.

According to some embodiments, the power transmission system may provide a self-locking mechanism with a first and a second element.

According to one aspect, the first joint transforms the second rotational movement into a first circular movement of the first element around the first joint, and the second joint transforms the first circular movement of the first element into a second circular movement of the second element around the second joint.

According to one aspect, a first axis is in the same plane as the first element, perpendicular to the longitudinal extension of the externally threaded shaft and running through the first joint, a second axis is in the same plane as the first element, perpendicular to the second element and running through the first joint, and the first axis and the second axis define an angle that varies in response to the first circular movement.

According to one aspect, the first joint transmits a first force of the forces via the first element to the second joint at the angle.

According to one aspect, the angle is between 60° and 90°.

According to one aspect, the angle is between 30° and 60°.

According to one aspect, the power transmission system further comprises a gearbox that generates the second rotational movement in response to the first rotational movement.

According to one aspect, the power transmission system further comprises a guide bracket that is attached to the internally threaded fastener.

According to one aspect, the guide bracket is adapted to guide movement of the internally threaded fastener along the externally threaded shaft.

According to one aspect, at least one of the first or second joint includes spherical plain bearings.

According to one aspect, the power transmission system further comprises a third element and an additional plateau. The third element comprises a first end that is movably attached to the internally threaded fastener at a fourth joint that is positioned on the internally threaded fastener at a side that is opposite the first joint, and a second end. The additional plateau is movably attached to the second end of the third element at a fifth joint and adapted to be attached to the component. The first and third elements together with the plateau and the additional plateau form a guide bracket that is adapted to guide movement of the internally threaded fastener along the externally threaded shaft.

Furthermore, a helicopter may include a fuselage, an external load device that is connected to the fuselage via a component and the power transmission system.

According to one aspect, the component may comprise a beam that is rigidly attached to the plateau at the third joint.

According to one aspect, the component may include a boom that is attached to the beam, wherein a rotation of the beam causes a circular movement of the boom.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Exemplary embodiments may be included in any devices or vehicles that include a component that is moved with high precision in a plane that is perpendicular to the height of the device or the vehicle. Examples for devices may include robots, cutting machines, CNC operators, quality control devices, etc. Examples for vehicles may include airplanes, quadcopters, helicopters, drones, cars, buses, trucks, e-bikes, motorcycles, ships, etc.

Figure 1:
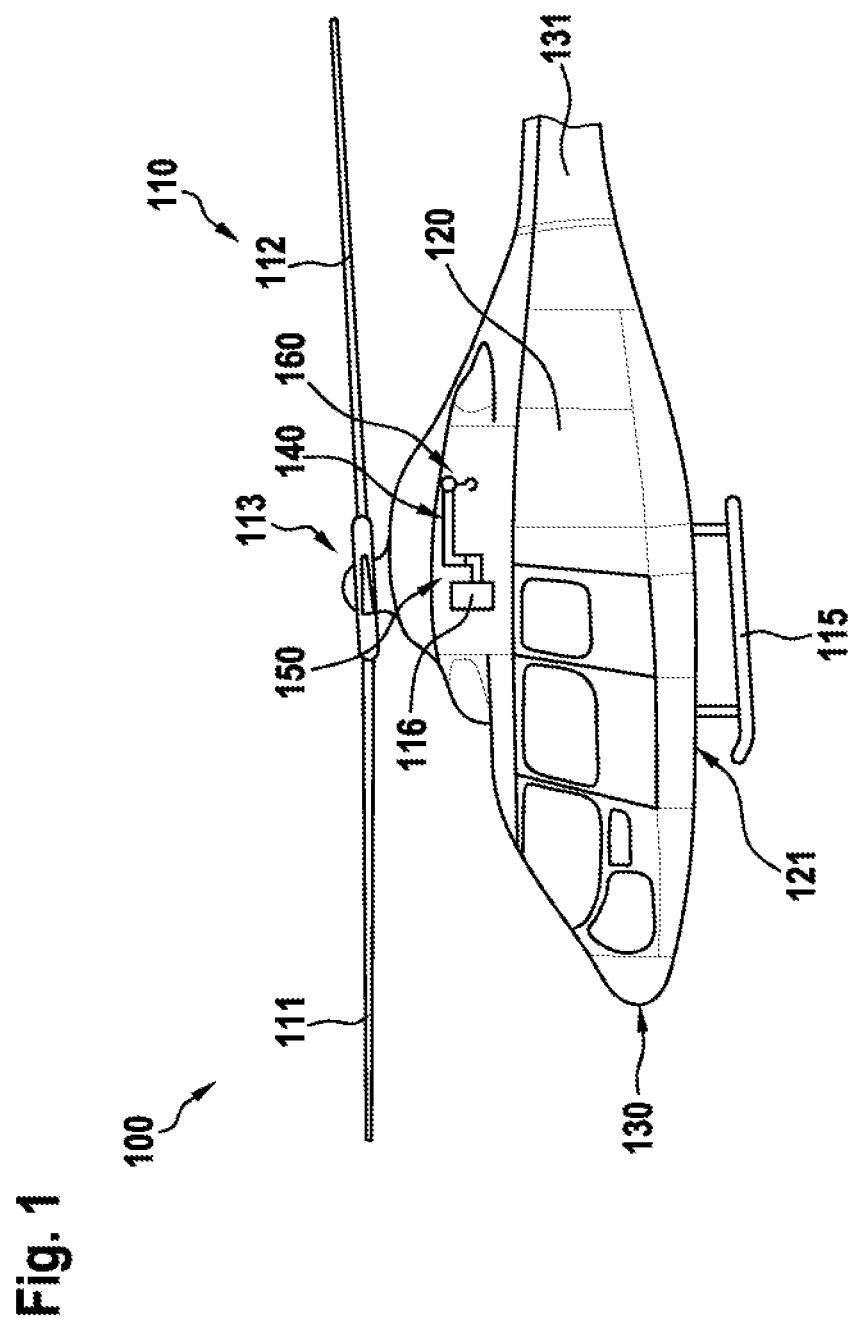
FIG. 1 is a diagram of an illustrative aircraft in accordance with some embodiments.

FIG. 1 shows an example of a vehicle. As shown in FIG. 1, the vehicle may be an aircraft 100. The aircraft may be an airplane, a drone, or a rotorcraft. Aircraft 100 is exemplarily illustrated as a helicopter. Thus, for purposes of simplicity and clarity, aircraft 100 is hereinafter referred to as "helicopter" 100.

Helicopter 100 is exemplarily embodied with fuselage 120 and at least one multi-blade main rotor 110 for providing lift and forward or backward thrust during operation.

At least one multi-blade main rotor 110 illustratively comprises a plurality of rotor blades 111, 112. Rotor blades 111, 112 are mounted at an associated rotor head 113 to a rotor shaft, which rotates in operation of helicopter 100 around the rotor shaft.

Fuselage 120 comprises fuselage underside 121 that is illustratively connected to landing gear 115. Landing gear 115 is exemplarily embodied as a skid-type landing gear.

Fuselage 120 may define nose region 130 that is arranged in front of fuselage 120. Fuselage 120 also defines tail boom 131, which is cut away and not shown in greater detail, for simplicity and clarity of the drawings.

If desired, helicopter 100 may provide equipment 160 such as an external load device (e.g., a hoist system) that is secured to fuselage 120 with component 140 that is attached to motor 116 via power transmission system 150. Motor 116 may illustratively be arranged under rotor head 113 and provide a rotational movement to power transmission system 150.

Power transmission system 150 may transform the rotational movement of motor 116 into a circular movement of component 140. An outward circular movement of component 140 (i.e., a circular movement of component 140 that moves equipment 160 away from helicopter 100) may deploy equipment 160, whereas an inward circular movement of component 140 (i.e., a circular movement of component 140 that moves equipment 160 closer to helicopter 100) may retrieve equipment 160.

Figure 2:
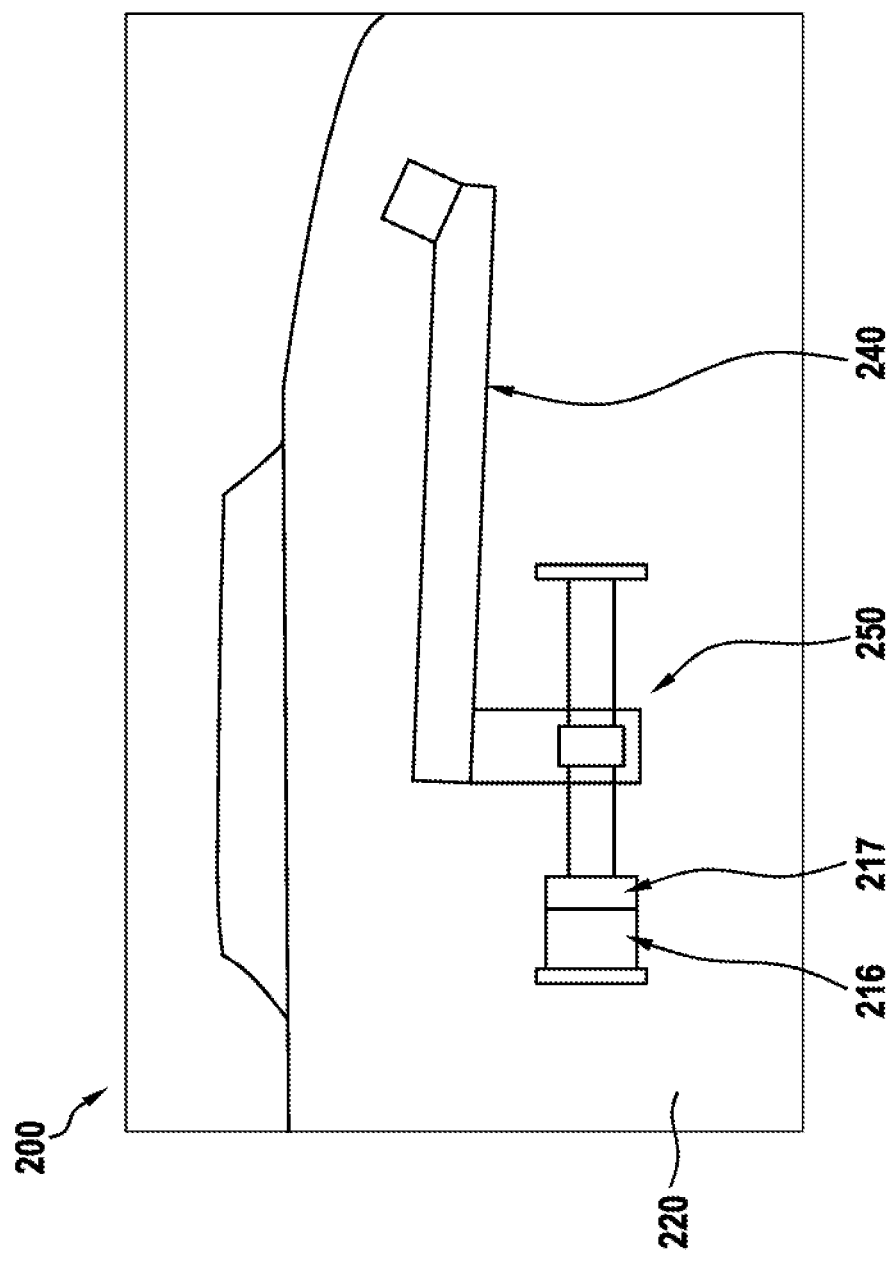
FIG. 2 is a partial view of an illustrative aircraft that includes a power transmission system in accordance with some embodiments.

FIG. 2 shows an illustrative aircraft 200 that is embodied with fuselage 220. As shown, fuselage 220 may include motor 216, component 240, and power transmission system 250.

Motor 216 may generate a rotational movement. Power transmission system 250 may connect component 240 with motor 216 via gearbox 217 and transform the rotational movement of motor 216 into a circular movement of component 240.

If desired, aircraft 200 may be a helicopter that may be used for transportation of people and/or cargo. For example, aircraft 200 may be used in military operations, construction, firefighting, search and rescue operations, tourism, medical transport, etc.

Helicopter 200 may include an external load device such as a lift, a hoist, an elevator, etc. For example, as shown in FIG. 2, helicopter 200 may include an external load device that is connected with fuselage 220 via component 240 and power transmission system 250.

In some embodiments, the external load device may be a hoist that deploys and retrieves a cable from a cable drum to hoist people or cargo. Hoists that are used for search and rescue are sometimes also referred to as rescue hoists and may be mounted on the outside of aircraft 200. Rescue hoists may be utilized to hoist one or more persons and/or cargo.

The rescue hoist may include a cable mechanism that winds and unwinds a cable. The hoist may be secured to aircraft 200 with a component (e.g., component 340 of FIG. 3) that includes a beam (e.g., beam 341 of FIG. 3) and a boom (e.g., boom 342 of FIG. 3). The boom may be mounted to the beam and may move the cable mechanism from a stashed, retrieved, or non-operational position to a deployed or operational position.

If desired, an alternating current (AC) variable frequency drive or power supply may provide power to motor 216. Motor 216 may be coupled to gearbox 217.

Motor 216 may generate a first rotational movement. Gearbox 217 may generate a second rotational movement in response to the first rotational movement. In other words, gearbox 217 may transform the first into a second rotational movement, thereby controlling a circular movement of component 240 via power transmission system 250.

Figure 3:
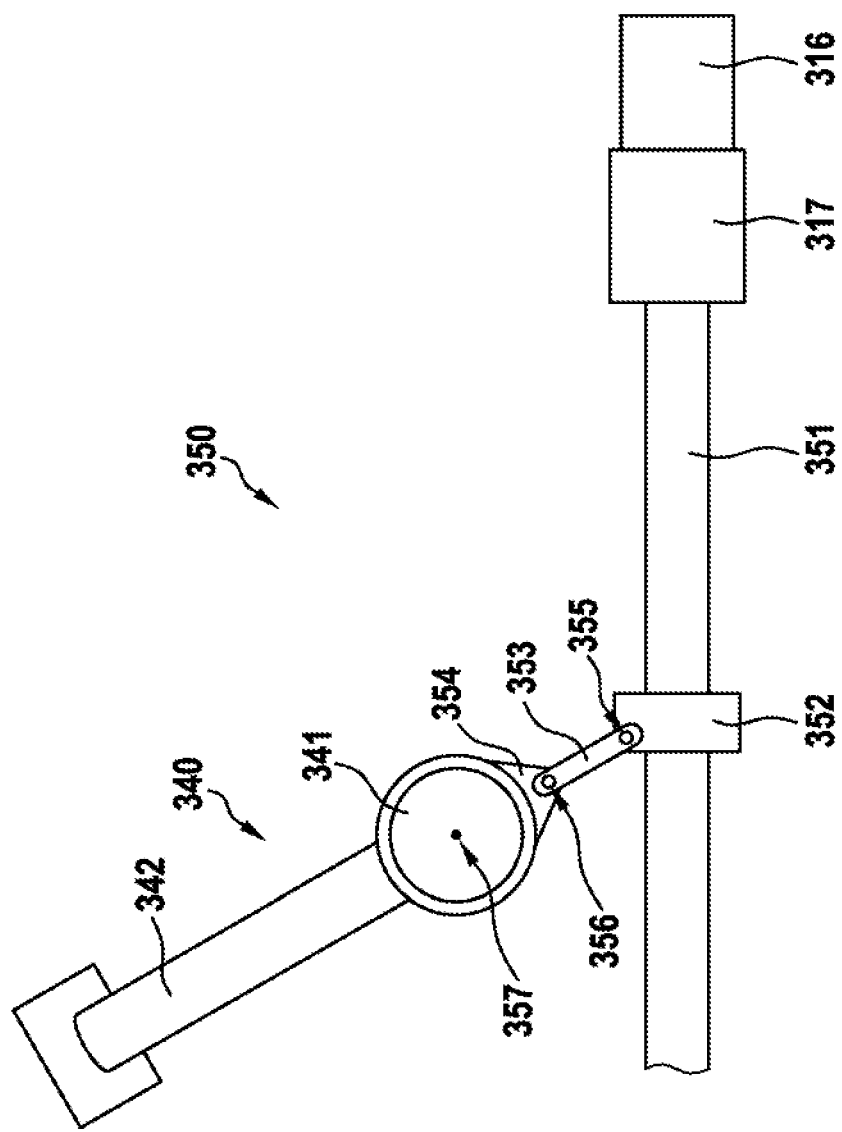
FIG. 3 is a diagram of an illustrative power transmission system that connects a component with a motor in accordance with some embodiments.

FIG. 3 illustrates power transmission system 350 that connects component 340 with motor 316. Component 340 may include beam 341 and boom 342 that is attached to beam 341.

Power transmission system 350 may include gearbox 317, externally threaded shaft 351 that is coupled to gearbox 317, internally threaded fastener 352, element 353 and plateau 354. Externally threaded shaft 351 is rotatably attached to motor 316 via gearbox 317.

Internally threaded fastener 352 is movably attached to externally threaded shaft 351. Element 353 is movably attached to internally threaded fastener 352 at joint 355. Plateau 354 is movably attached to element 353 at joint 356 and rigidly attached to beam 341 at joint 357.

In some embodiments, plateau 354 may form joint 357 as a ring that is rigidly attached to the outer surface of beam 341. If desired, beam 341 may stand on plateau 354, and joint 357 that rigidly attaches beam 341 to plateau 354 may be at the contact surface between plateau 354 and beam 341.

Any material that allows to rigidly attach plateau 354 and beam 341 with each other may form joint 357. For example, plateau 354 and beam 341 may be rigidly attached to beam 341 using an adhesive or using welding. If desired, one or more fasteners may rigidly attach beam 341 to plateau 354. In some embodiments, plateau 354 and beam 341 may be produced as one part (e.g., using composite materials or metals).

If desired, motor 316 may be an electric motor that converts an electric energy into a mechanical energy. Electric motor 316 may electromagnetically induce a relative movement in an air gap between a stator and a rotor to produce torque around the longitudinal extension of externally threaded shaft 351.

Power transmission system 350 may include gearbox 317 that is coupled to motor 316. Gearbox 317 may include a gear set that transfers the torque and speed output of motor 316 to a rotational movement relative to a longitudinal extension of externally threaded shaft 351. The rotational movement from gearbox 317 may be utilized to rotate externally threaded shaft 351.

Externally threaded shaft 351 may be coupled to internally threaded fastener 352. Internally threaded fastener 352 may transform the torque from gearbox 317 into a linear force in direction to the longitudinal extension of externally threaded shaft 351. Therefore, in response to a rotational movement of externally threaded shaft 351, internally threaded fastener 352 may perform a movement along externally threaded shaft 351.

For example, internally threaded fastener 352 may be a ball screw that translates the rotational movement of externally threaded shaft 351 to a linear movement. Externally threaded shaft 351 may provide a helical raceway for the ball bearing which acts as a precision screw. The ball bearing may be made to close tolerances and may be suitable for use in scenarios in which high precision is necessary. The assembly of the ball bearing may act as a nut while the externally threaded shaft acts as a screw.

If desired, for transforming a rotational movement of motor 316 a thread-less ball screw may be used, instead of internally threaded fastener 352. For example, three (or more) rolling-ring bearings may be arranged symmetrically in a housing surrounding a thread-less shaft instead of externally threaded shaft 351. The bearings may be set at an angle to the shaft, and this angle determines the direction and rate of the linear movement per revolution of the shaft.

In some embodiments, element 353 may be movably attached to internally threaded fastener 352 at joint 355. Joint 355 may be arranged parallel to an axis that is perpendicular to the longitudinal extension of externally threaded shaft 351.

Joint 355 may transmit forces from internally threaded fastener 352 to element 353. For example, in response to a linear movement of internally threaded fastener 352 along the longitudinal extension of externally threaded shaft 351, joint 355 may provide a circular movement to element 353 around the axis that is perpendicular to the longitudinal extension of externally threaded shaft 351. In other words, joint 355 may provide the circular movement to element 353 which may sweep an area that is defined around the axis that is perpendicular to the longitudinal extension of externally threaded shaft 351.

Plateau 354 may be movably attached to element 353 at joint 356. If desired, joints 355 and 356 may both be hinge-type joints that are rotatable around parallel axes defined by the respective joint. In some scenarios, at least one of joints 355 and 356 may include spherical bearings. In these scenarios, joint 356 may be arranged non-parallelly to joint 355.

Element 353 may transmit forces from joint 355 to plateau 354 at joint 356. In response to a circular movement of element 353 around joint 355, plateau 354 may perform a circular movement around joint 356.

If desired, plateau 354 together with element 353 and joints 355, 356 may form a guide bracket that is adapted to guide movement of internally threaded fastener 352 along externally threaded shaft 351. Plateau 354 may prevent rotation of internally threaded fastener 352 around externally threaded shaft 351, thereby ensuring a movement of internally threaded fastener 352 in direction of the longitudinal extension of externally threaded shaft 351.

As shown in FIG. 3, plateau 354 may include a hole that receives beam 341. The center of the hole may define joint 357, and plateau 354 may transmit the forces from joint 356 to joint 357. In some embodiments, plateau 354 may be rigidly attached to beam 341, and a circular movement of plateau 354 around an axis defined by joint 356 may lead to a rotation of beam 341 around joint 357. Thus, joint 357 may provide a circular movement to component 340 in response to a rotational movement of motor 316.

For example, joints 355, 356 may include any type of bearings that reduce friction between moving parts. Joints 355, 356, and 357 may constrain the rotational movement of internally threaded fastener 352 to a movement along externally threaded shaft 351, if desired.

The bearings may, for example, provide a linear movement to element 353 or a circular movement around joint 355. Joints 355, 356, 357 may prevent certain movements by controlling the vectors of forces that bear on the parts that are connected by joints 355, 356, 357.

If desired, joints 355, 356 may include spherical plain bearings. The spherical plain bearings may provide a circular movement about joints 355, 356 in two orthogonal directions with an angle. These bearings may allow a non-parallel arrangement of joints 355, 356, 357.

Figure 4:
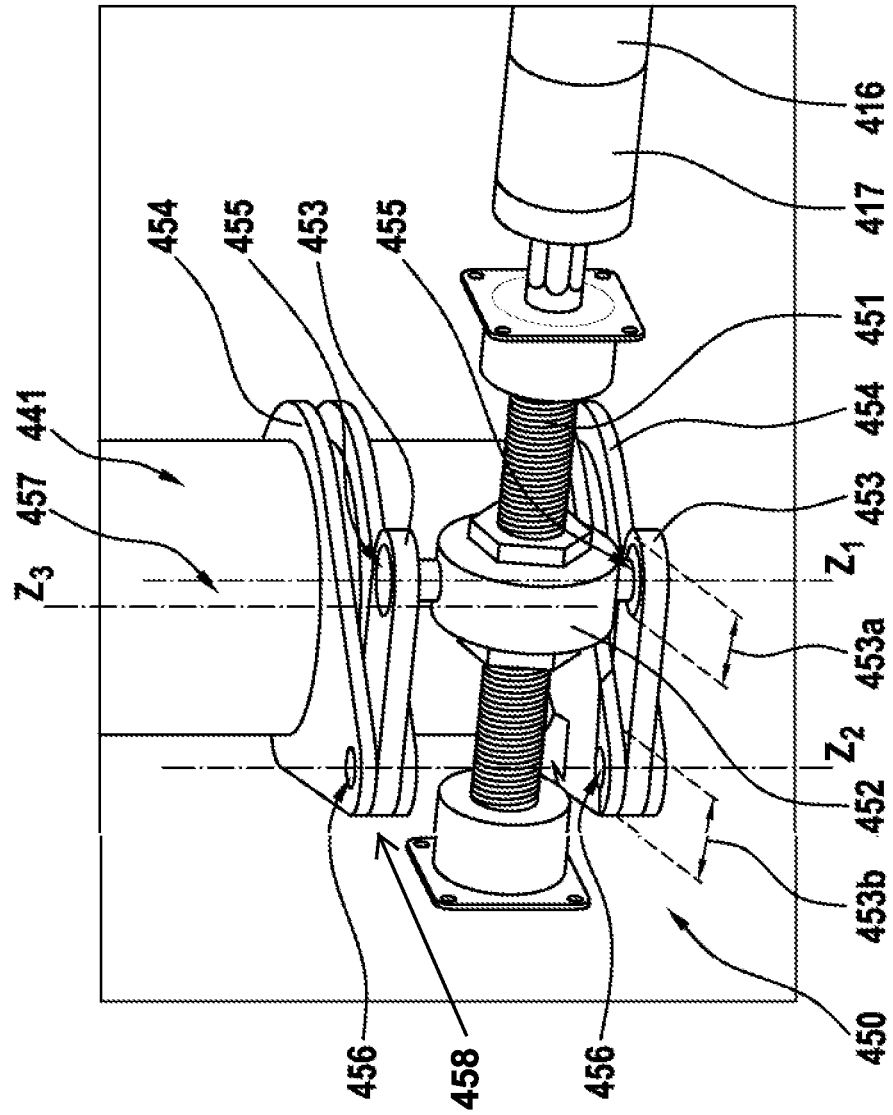
FIG. 4 is a diagram of an illustrative power transmission system that includes an additional plateau in accordance with some embodiments.

FIG. 4 illustrates power transmission system 450 that connects motor 416 with component 440 which includes beam 441. Power transmission system 450 may include gearbox 417, externally threaded shaft 451 that is coupled to gearbox 417, internally threaded fastener 452, elements 453, and plateaus 454.

Externally threaded shaft 451 is rotatably attached to motor 416 and gearbox 417. Internally threaded fastener 452 is movably attached to externally threaded shaft 451.

Elements 453 may be arranged parallel to each other. Each of elements 453 may include two ends 453a, 453b. Each end 453a may be pivotably attached to internally threaded fastener 452 at joints 455 that are arranged parallelly to axis Z1.

Plateaus 454 may be arranged parallel to each other. Each of plateaus 454 may be attached between element 453 and beam 441 at joints 456, 457, respectively. Joints 456, 457 may define axes Z2, Z3. Axes Z2, Z3 may be non-parallel to axis Z1 (e.g., if joint 456 includes spherical bearings).

Power transmission system 450 may include gearbox 417. Gearbox 417 may be coupled to motor 416. Gearbox 417 may include a gear set that transfers the torque and speed of motor 416 into a rotational movement relative to the longitudinal extension of externally threaded shaft 451. The rotational movement transmitted by gearbox 417 may cause a rotational movement of externally threaded shaft 451.

In some embodiments, internally threaded shaft 452 may be coupled to externally threaded fastener 451. Internally threaded fastener 452 may transform the torque from gearbox 417 to a linear force in direction to the longitudinal extension of externally threaded shaft 451. In other words, in response to a rotation of externally threaded shaft 451, internally threaded fastener 452 may move along externally threaded shaft 451.

If desired, internally threaded fastener 452 may be a ball screw that translates the rotational movement of externally threaded shaft 451 to a linear movement. Externally threaded shaft 451 may provide a helical raceway for the ball bearing which may act as a precision screw. The ball bearing may be made to close tolerances and may be suitable for use in the scenarios in which high precision is necessary.

In some embodiments, each one of elements 453 may be movably attached to internally threaded fastener 452 at ends 453a with joints 455 along axis Z1. In other words, joints 455 may be arranged along axis Z1 and transmit the forces from internally threaded fastener 452 to elements 453.

In response to the linear movement of internally threaded fastener 452 along externally threaded shaft 451, joints 455 may provide a circular movement around axis Z1. The circular movement around axis Z1 may allow elements 453 to sweep the area around axis Z1.

Plateaus 454 may be movably attached to elements 453 at joints 456. Joints 456 may define axis Z2. Elements 453 may transmit the forces from internally threaded fastener 452 via joints 455 to plateaus 454 at joints 456. For example, in response to the circular movement of elements 453, joints 456 may provide a circular movement around axis Z2. As a result, plateaus 454 may perform a circular movement around axis Z2.

If desired, plateaus 454 together with elements 453 may form a guide bracket 458 that is adapted to guide movement of internally threaded fastener 452 along externally threaded shaft 451. For example, plateaus 454 and elements 453 may counteract forces that are exerted on internally threaded fastener 452, and that are not in direction of the longitudinal extension of externally threaded shaft 451.

As shown, plateaus 454 may be rigidly attached to beam 441. For example, each plateau 454 may include a hole that receives beam 441. In other words, plateau 454 may form joint 457 as a ring that is rigidly attached to the outer surface of beam 441.

The center of the hole may define axis Z3 that extends through joint 457, and plateaus 454 may transmit the forces from joint 456 to joint 457. Plateau 454 may via joint 457 transform a rotational movement of joint 456 into a rotation of beam 441 around axis Z3.

If desired, joints 455, 456 may include spherical plain bearings. The spherical plain bearings may provide a circular movement about axes 21, Z2 in two orthogonal directions that are perpendicular to axes Z2, Z2 with an angle. Said bearings may enable a constellation in which joints 455, 456, 457 are arranged non-parallelly.

Figure 5A:
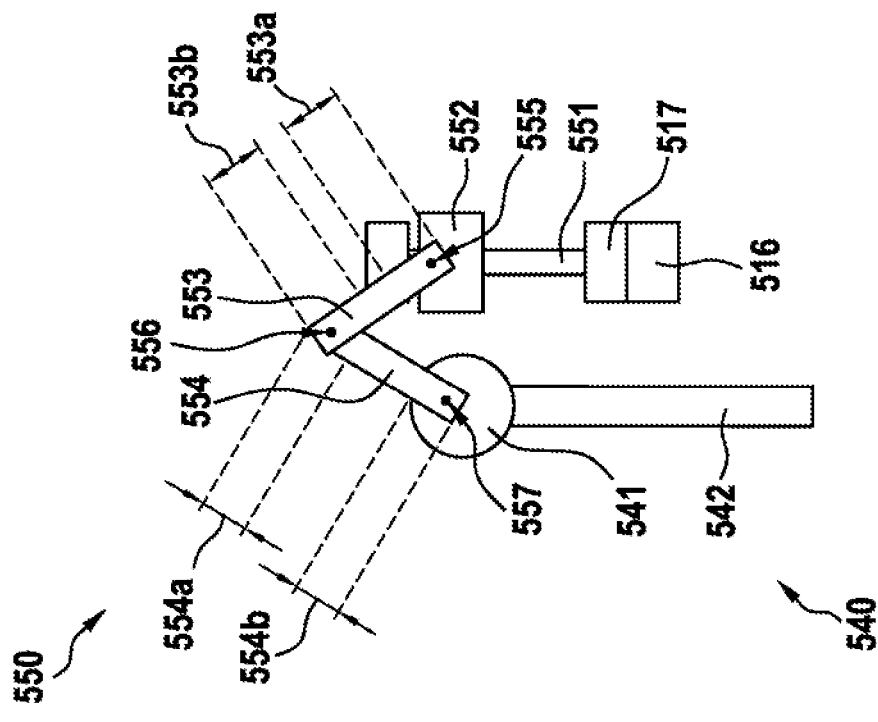
FIG. 5A is a plan view of an illustrative power transmission system that includes a first element that is positioned parallel to an externally threaded shaft in accordance with some embodiments.

In some embodiments, the power transmission system may deploy and retrieve the component. FIG. 5A shows power transmission system 550 connected to component 540 that is in a deployed position, and FIG. 5B shows power transmission 550 connected to component 540 in a retrieved position.

Figure 5B:
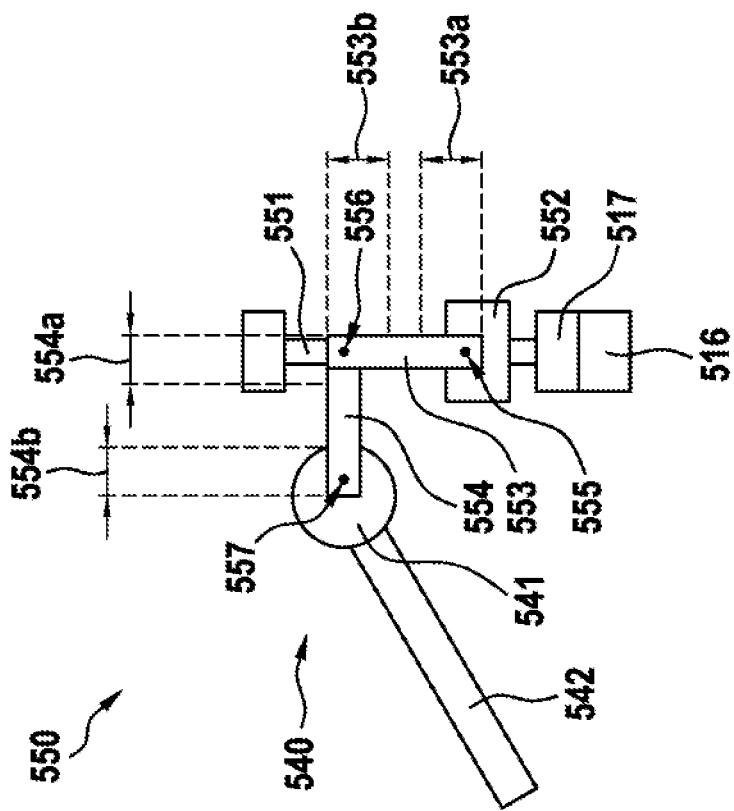
FIG. 5B is a plan view of an illustrative power transmission system that includes a first element that is positioned non-parallel to an externally threaded shaft in accordance with some embodiments.

FIGS. 5A and 5B illustrate power transmission system 550 that is adapted to transmit forces from motor 516 that generates a rotational movement to component 540. Component 540 may include beam 541 and boom 542 that is attached to beam 541.

Power transmission system 550 may include gearbox 517, externally threaded shaft 551, internally threaded fastener 552 and elements 553, 554. Externally threaded shaft 551 may be rotatably attached to motor 516 and perform another rotational movement. If desired, externally threaded shaft 551 may be rotatably attached to motor 516 via gearbox 517.

Gearbox 517 may generate the other rotational movement in response to the rotational movement generated by motor 516. If desired, gearbox 517 may have at least two gears. For example, in a first gear, gearbox 517 may rotate externally threaded shaft 551 in a clockwise direction. In a second gear, gearbox 517 may rotate externally threaded shaft 551 in a counter-clockwise direction that is the opposite direction to the clockwise direction.

In some embodiments, gearbox 517 may be omitted from power transmission system 550, and motor 516 may rotate in two different directions. For example, motor 516 may be a direct current (DC) electric motor that may change the direction of rotation by switching the direction of the current flowing through the electric motor.

For example, a DC electric motor may have first and second contacts. Connecting the plus and minus poles of a power source to the first and second contacts, respectively, may rotate the electric motor in a clockwise direction, while connecting the plus and minus poles of a power source to the second and first contacts, respectively, may rotate the electric motor in a counter-clockwise direction. In other words, switching the connections between the power source and the electric motor may change the direction of rotation of the electric motor.

Internally threaded fastener 552 is movably attached to externally threaded shaft 551. Internally threaded fastener 552 may perform a linear movement along externally threaded shaft 551 in response to the rotational movement of externally threaded shaft 551.

Rotating externally threaded shaft 551 in a first direction may move internally threaded fastener 552 on externally threaded shaft 551 in a first direction, while rotating externally threaded shaft 551 in a second direction that is opposite to the first direction may move internally threaded fastener 552 on externally threaded shaft 551 in a second direction that is opposite the first direction.

For example, rotating externally threaded shaft 551 in a clockwise direction may move internally threaded fastener 552 on externally threaded shaft 551 closer to gearbox 517 and/or motor 516, while rotating externally threaded fastener 551 in a counter-clockwise direction may move internally threaded fastener 552 on externally threaded shaft 551 further away from gearbox 517 and/or motor 516.

As another example, rotating externally threaded shaft 551 in a clockwise direction may move internally threaded fastener 552 on externally threaded shaft 551 further away from gearbox 517 and/or motor 516, while rotating externally threaded fastener 551 in a counter-clockwise direction may move internally threaded fastener 552 on externally threaded shaft 551 closer to gearbox 517 and/or motor 516.

Element 553 may include two ends 553*a*, 553*b* and element 554 may include two ends 554*a*, 554*b*. End 553*a* may be movably attached to internally threaded fastener 552 at joint 555. End 553*b* may be movably attached to end 554*a* at joint 556, and end 554*b* may be rigidly attached to beam 541 of component 540 at joint 557.

If desired, joints 555, 556 may include spherical plain bearings. In some embodiments, at least one of joints 555 or 556 may include hinges.

Element 553 may transmit forces from joint 555 to joint 556. Element 554 may transmit forces from joint 556 to joint 557. For example, joint 555 may transforms the rotational movement of externally threaded shaft 551 via a linear movement of internally threaded fastener 552 into a circular movement of the element 553 around the joint 555.

Joint 556 may transform the circular movement of element 553 into a circular movement of element 554 around joint 556, and joint 557 may transform the circular movement of element 554 into a rotational movement of beam 541. The rotational movement of beam 541 results in a circular movement of boom 542 and thereby in a circular movement of component 540.

For example, beam 541 that is rigidly attached to element 554 at joint 557 may perform a rotation around an axis defined by joint 557. Boom 542 may be attached to beam 541. For example, boom 542 may be attached to beam 541 such that the longitudinal extension of boom 542 is perpendicular to the longitudinal extension of beam 541. In this example, a rotation of beam 541 may cause a circular movement of boom 542.

According to some embodiments, power transmission system 550 may include a guide bracket that is attached to internally threaded fastener 552. The guide bracket may guide a linear movement of internally threaded fastener 552 along the longitudinal extension of externally threaded fastener 551, for example, by preventing a rotational movement of internally threaded fastener 552 at the same time as externally threaded shaft 551. In other words, the guide bracket may prevent the forces that are exerted to internally threaded fastener 552 and that are not in the direction of the longitudinal extension of externally threaded fastener 551.

FIG. 5A shows component 540 in a deployed position. During the deployment of component 540, externally threaded shaft 551 may rotate such that internally threaded fastener 552 moves closer to motor 516 and/or gearbox 517. Internally threaded fastener 552 may pull on element 553 via joint 555 such that element 553 moves into a position in which its longitudinal extension is arranged parallelly to the longitudinal extension of externally threaded shaft 551.

Element 553 may pull on element 554 via joint 556 such that element 554 moves into a position that is perpendicular to the longitudinal extension of externally threaded shaft 551. As a result, element 554 may rotate beam 541 via joint 557.

As shown, boom 542 may be attached to beam 541 such that the longitudinal extension of boom 542 is perpendicular to the longitudinal extension of beam 541. Thus, a rotation of beam 541 may cause a circular movement of boom 542 from the retrieved to the deployed position.

FIG. 5B shows component 540 in a retrieved position. During the retrieving of component 540, externally threaded shaft 551 may rotate such that internally threaded fastener 552 moves further away from motor 516 and/or gearbox 517. Internally threaded fastener 552 may push element 553 via joint 555 such that element 553 moves into a position in which its longitudinal extension is arranged non-parallelly to the longitudinal extension of externally threaded shaft 551.

In response to a linear movement of internally threaded fastener 552 along the longitudinal extension of externally threaded shaft 551 away from motor 516 and/or gearbox 517, joint 555 may provide a circular movement to element 553.

In response to the circular movement of element 553, element 554 may perform a circular movement around joint 556, and element 554 may rotate beam 541 via joint 557.

As shown, boom 542 may be attached to beam 541 such that the longitudinal extension of boom 542 is perpendicular to the longitudinal extension of beam 541. Thus, a rotation of beam 541 may cause a circular movement of boom 542 from the deployed to the retrieved position.

Figure 6A:
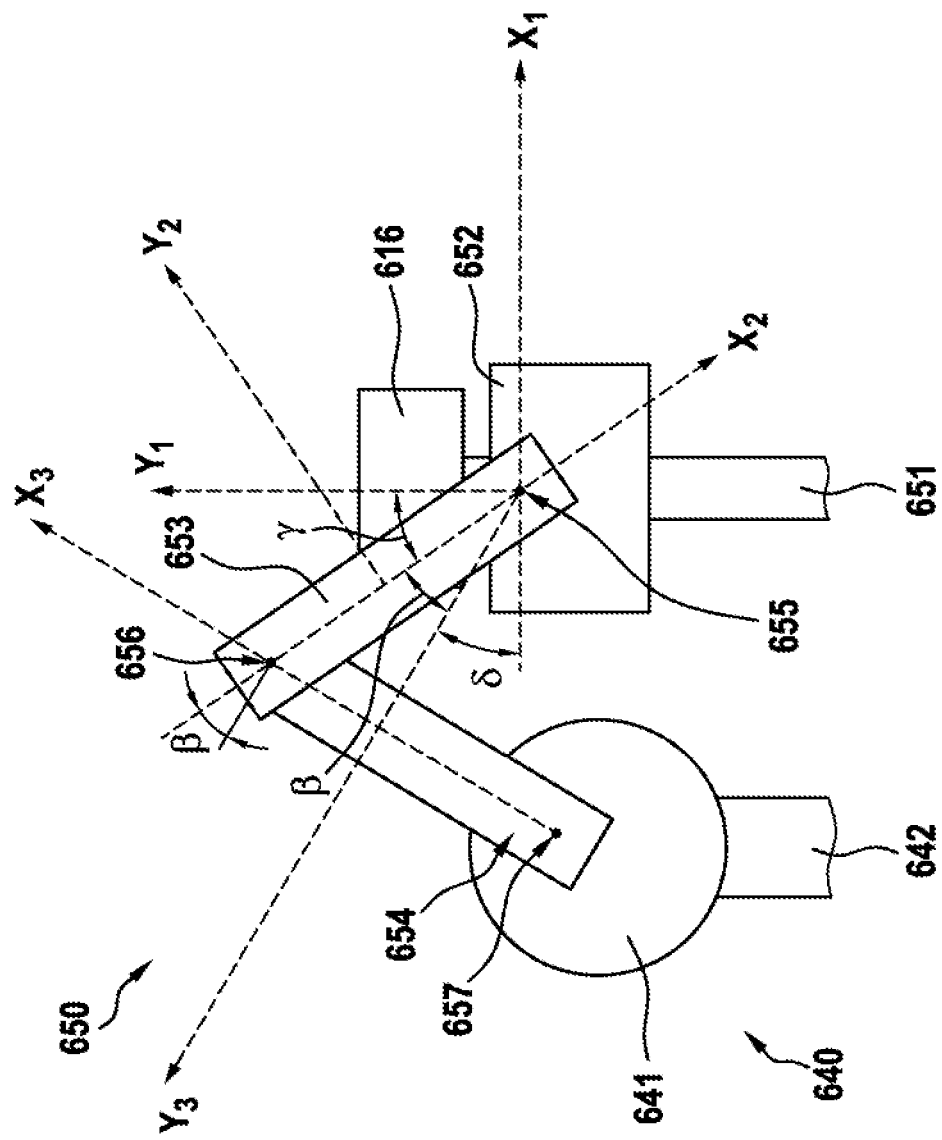
FIG. 6A is a plan view of an illustrative power transmission system that includes axes of joints in accordance with some embodiments.
Figure 6B:
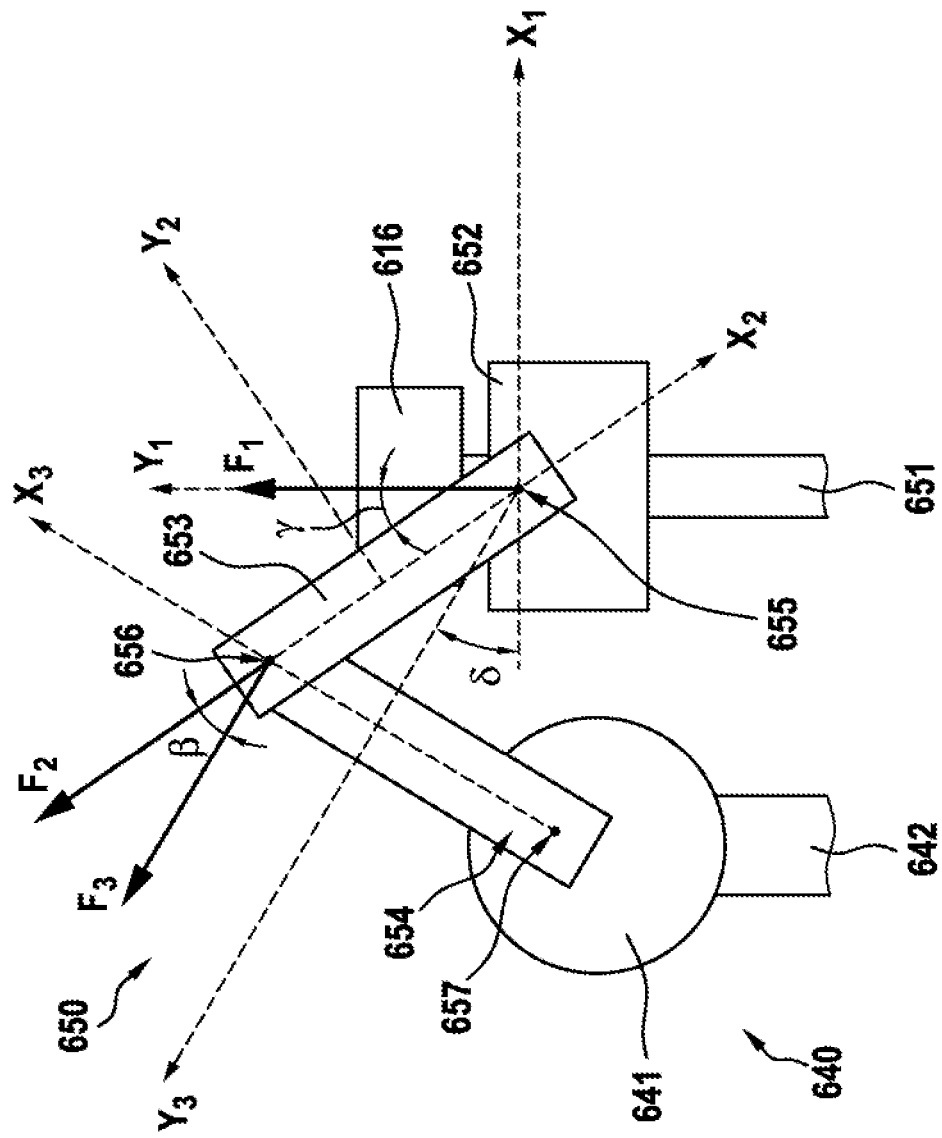
FIG. 6B is a plan view of an illustrative power transmission system that allows to transmit forces between joints in accordance with some embodiments.

FIGS. 6A and 6B illustrate power transmission system 650 that connects motor 616 with component 640 that is in a retrieved position, which is sometimes also referred to as the stowed position of component 640.

Component 640 may include beam 641 and boom 642 that is attached to beam 641. For example, boom 642 may be attached to beam 641 such that a rotational movement of beam 641 results in a circular movement of boom 642.

Power transmission system 650 may include externally threaded shaft 651, internally threaded fastener 652, and elements 653, 654. Externally threaded shaft 651 may be rotatably attached to motor 616. Internally threaded fastener 652 may be movably attached to externally threaded shaft 651.

Element 653 may be movably attached to internally threaded fastener 652 at joint 655. Element 654 may be movably attached to element 653 at joint 656 and rigidly attached to beam 641 at joint 657.

Axis Y1 may be defined as being in direction of longitudinal extension of externally threaded shaft 651. Axis X1 may be defined as being in the same plane as element 653, perpendicular to axis Y1 through joint 655. Axis X2 may be defined as being in the same plane as element 653 and crossing joints 655 and 656. Axis X3 may be defined as being in the same plane as element 653 and crossing joints 656 and 657.

In other words, axis X1 intersects with axis X2 at joint 655, and axis X2 intersects with axis X3 at joint 656. Axis Y2 may be defined as being in the same plane as element 653, perpendicular to axis X2 through the rotation axis of beam 641. Axis Y3 may be defined as being in the same plane as element 653, perpendicular to axis X3 through joint 655.

Internally threaded fastener 652 may transform the torque from motor 616 into a linear force in direction of axis Y1. Therefore, in response to a rotation of externally threaded shaft 651, internally threaded fastener 652 may move along axis Y1.

In some embodiments, in a retrieved position of component 640, as internally threaded fastener 652 moves linearly along axis Y1 closer to motor 616, joint 655 may provide a circular movement to element 653. In other words, as shown in FIGS. 6A and 6B, element 653 may move from axis Y1 with a circular movement. In response to the circular movement of element 653, axis X2 and axis Y1 may define angle γ.

As element 653 sweeps an area that is defined by angle γ, element 654 may perform both linear and circular movements. Angle 1 may be defined between axis X2 and axis Y3, and angle δ may be defined between axis X1 and axis Y3.

As shown in FIG. 6B, internally threaded fastener 652 may transform the torque from motor 616 into linear force F1 in direction of axis Y1. As shown in FIGS. 6A and 6B, in response to force F1, internally threaded fastener 652 may move along externally threaded shaft 651 in direction of axis Y1 closer to motor 616.

Joint 655 may transform force F1 into force F2. Force F2 may allow element 653 to perform a circular movement around joint 655.

The relationship between force F1 that is provided for the linear movement of internally threaded fastener 652 and force F2 that is provided for the circular movement of element 653 may be defined with equations 1, 2 and 3 as follows:

$$F2_{X2} = F1_{X1} \cos(90-\gamma) + F1_{Y1} \sin(90-\gamma) \quad (1)$$

$$F2_{y2} = -F1_{X1} \sin(90-\gamma) + F1_{Y1} \cos(90-\gamma) \quad (2)$$

$$F2 = \sqrt{(F2_{X2})^2 + (F2_{Y2})^2} \quad (3)$$

where $F1_{X1}$, $F1_{Y1}$, are the components of force F1 along axes X1 and Y1, respectively, and $F2_{X2}$, and $F2_{Y2}$ are the components of force F2 in direction of axes X2 and Y2, respectively.

Element 653 may transmit force F2 to element 654 at joint 656. Joint 656 may transform force F2 into force F3 that is parallel to axis Y3. Therefore, element 654 may perform a circular movement around joint 656.

The relationship between force F2 that is provided for the circular movement of element 653 and force F3 that is provided for the circular movement of element 654 may be defined with equations 4, 5 and 6 as follows:

$$F3_{X3} = F2_{Y2} \cos\beta - F2_{X2} \sin\beta \quad (4)$$

$$F3_{Y3} = -F2_{X2} \cos\beta - F2_{Y2} \sin\beta \quad (5)$$

$$F3 = \sqrt{(F3_{X3})^2 + (F3_{Y3})^2} \quad (6)$$

where $F2_{X2}$, $F2_{Y2}$, are the components of force F2 along axes X2 and Y2, respectively, and $F3_{X3}$, and $F3_{Y3}$ are the components of force F3 in direction of axes X3 and Y3, respectively.

In some embodiments, in response to circular movement of element 654, a relationship between force F1 from internally threaded fastener 652 and force F3 that is provided for the circular movement of element 654 may be defined with equations 7, 8 and 9 as follows:

$$F3_{X3} = F1_{X1} \cos(90-\delta) + F1_{Y1} \sin(90-\delta) \quad (7)$$

$$F3_{Y3} = -F1_{X1} \sin(90-\delta) + F1_{Y1} \cos(90-\delta) \quad (8)$$

$$F3 = \sqrt{(F3_{X3})^2 + (F3_{Y3})^2} \quad (9)$$

where $F1_{X1}$, $F1_{Y1}$, are the components of force F1 along axes X1 and Y1, respectively, and $F3_{X3}$, and $F3_{Y3}$ are the components of force F3 in direction of axes X3 and Y3, respectively.

At some angles δ, element 653 may not transmit force F1 totally to element 654 at joint 656. Thus, force F3 may be lower than force F1 in response to the circular movement of element 653.

If desired, element 654 may transmit force F3 when angle δ is between 60° and 90°. In some embodiments, based on the retrieved and/or deployed position of component 640 and/or on the position of internally threaded fastener 652 on externally threaded shaft 651, angle δ may be between 30° and 60°.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, power transmission system 350 of FIG. 3 is shown with one element 353 and one plateau 354 that are attached to each other at joint 356. However, power transmission system 350 of FIG. 3 may have any number of elements 353 that are attached to any number of plateaus 354.

For example, power transmission system 350 of FIG. 3 may have two elements 353 that are attached to one plateau 354 at joint 356, or five elements 353 that are attached to five plateaus 354 at joint 356, etc.

As another example, power transmission system 550 of FIGS. 5A and 5B is shown with one element 553 and one element 554 that are attached to each other at joint 556. However, power transmission system 550 of FIGS. 5A and 5B may include any number of elements 553, 554.

For example, power transmission system 550 of FIGS. 5A and 5B may include three elements 553 that are arranged parallelly to each other and three elements 554 that are attached parallelly to three elements 553 at three joints 556.

Moreover, if desired, plateau 354 and/or 454 that receives beam 341, 441 may be of any shape including polygonal, irregular, or rounded shapes, such as triangular, rectangular, trapezoidal, round, oval, elliptical, or hourglass shapes.

Furthermore, the described and illustrated configurations of power transmission system 250, 350, 450, 550, 650 can be varied arbitrarily without influencing an underlying functionality thereof. As a consequence, corresponding configurations of elements and plateaus can be adapted as required, and so on.

Additionally, components of power transmission system 550 may be arranged such that instead of moving closer to motor 516 and/or gearbox 517 during the deployment of component 540 shown in FIG. 5A, internally threaded fastener 552 may move further away from motor 516 and/or gearbox 517.

Similarly, components of power transmission system 550 may be arranged such that instead of moving further away from motor 516 and/or gearbox 517 during the retrieving of component 540 shown in FIG. 5B, internally threaded fastener 552 may move closer to motor 516 and/or gearbox 517.

REFERENCE LIST 100 aircraft
110 multi-blade main rotor
111, 112 rotor blades
113 rotor head
115 landing gear
116 motor
120 fuselage
121 fuselage underside
130 nose region
131 tail boom
140 component
150 power transmission system
160 equipment
200 aircraft
216 motor
217 gearbox
220 fuselage
240 component
250 power transmission system
316 motor
317 gearbox
340 component
341 beam
342 boom
350 power transmission system
351 externally threaded shaft
352 internally threaded fastener
353 element
354 element
355, 356, 357 joint
416 motor
417 gearbox
440 component
441 beam
450 power transmission system
451 externally threaded shaft
452 internally threaded fastener
453 element
453a, 453b end
454 plateau, guide bracket
455, 456, 457 joint
516 motor
517 gearbox
540 component
541 beam
542 boom
550 power transmission system
551 externally threaded shaft
552 internally threaded fastener
553 element
553a, 553b end
554 element
554a, 554b end
555, 556, 557 joint
616 motor
640 component
641 beam
642 boom
650 power transmission system
651 externally threaded shaft
652 internally threaded fastener
653 element
654 element
655, 656, 657 joint
X1, X2, X3 axis
Y1, Y2, Y3 axis
Z1, Z2, Z3 axis
δ, β, γ angle
F1, F2, F3 circular movement forces of joints

What is claimed is:

1. A helicopter comprising a fuselage, an external load device that is connected to the fuselage via a component and a power transmission system that is adapted to transmit forces from a motor that generates a first rotational movement to the component, wherein the power transmission system comprises:
   an externally threaded shaft that is configured to be rotatably attached to the motor and performs a second rotational movement;
   an internally threaded fastener that is movably attached to the externally threaded shaft and performs a movement along the externally threaded shaft in response to the second rotational movement;
   a first element that comprises:
      a first end that is movably attached to the internally threaded fastener at a first joint, and
      a second end; and
   a second element that comprises:
      a plateau having a first end and a second end, wherein the first end is movably attached to the second end of the first element at a second joint, wherein the first element transmits the forces from the first joint to the second joint, and
      the second end is adapted to be rigidly attached to the component at a third joint, wherein the plateau transmits the forces from the second joint to the third joint by transforming a rotational movement of the second joint into a rotation of the component.

2. The helicopter of claim 1, wherein the first joint transforms the second rotational movement into a first circular movement of the first element around the first joint, and wherein the second joint transforms the first circular movement of the first element into a second circular movement of the second element around the second joint.

3. The helicopter of claim 2, wherein a first axis is in the same plane as the first element, perpendicular to the longitudinal extension of the externally threaded shaft and running through the first joint, wherein a second axis is in the same plane as the first element, perpendicular to the second element and running through the first joint, and wherein the first axis and the second axis define an angle that varies in response to the first circular movement.

4. The helicopter of claim 3, wherein the first joint transmits a first force of the forces via the first element to the second joint at the angle.

5. The helicopter of claim 4, wherein the angle is between 60° and 90°.

6. The helicopter of claim 4, wherein the angle is between 30° and 60°.

7. The helicopter of claim 1, wherein the power transmission system further comprises:

a gearbox that generates the second rotational movement in response to the first rotational movement.

8. The helicopter of claim 1, wherein the power transmission system further comprises:
a guide bracket that is attached to the internally threaded fastener.

9. The helicopter of claim 8, wherein the guide bracket is adapted to guide the movement of the internally threaded fastener along the externally threaded shaft.

10. The helicopter of claim 1, wherein the power transmission system further comprises:
a third element that comprises:
a first end that is movably attached to the internally threaded fastener at a fourth joint that is positioned on the internally threaded fastener at a side that is opposite the first joint, and
a second end; and
an additional plateau that is movably attached to the second end of the third element at a fifth joint and adapted to be attached to the component, wherein the first and third elements together with the plateau and the additional plateau) form a guide bracket that is adapted to guide movement of the internally threaded fastener along the externally threaded shaft.

11. The helicopter of claim 1, wherein the component further comprises:
a beam that is rigidly attached to the plateau at the third joint.

12. The helicopter of claim 11, wherein the component further comprises:
a boom that is attached to the beam, wherein the rotation of the beam causes a circular movement of the boom.

13. A power transmission system adapted to transmit forces from a motor that generates a first rotational movement to a component, the power transmission system comprising:
an externally threaded shaft that is configured to be rotatably attached to the motor and performs a second rotational movement;
an internally threaded fastener that is movably attached to the externally threaded shaft and performs a movement along the externally threaded shaft in response to the second rotational movement;
a first element that comprises:
a first end that is movably attached to the internally threaded fastener at a first joint, and
a second end;
a second element that comprises:
a plateau having a first end and a second end, wherein the first end is movably attached to the second end of the first element at a second joint, wherein the first element transmits the forces from the first joint to the second joint, and
the second end is adapted to be rigidly attached to the component at a third joint, wherein the plateau transmits the forces from the second joint to the third joint by transforming a rotational movement of the second joint into a rotation of the component;
a third element that comprises:
a first end that is movably attached to the internally threaded fastener at a fourth joint that is positioned on the internally threaded fastener at a side that is opposite the first joint, and
a second end; and
an additional plateau that is movably attached to the second end of the third element at a fifth joint and adapted to be attached to the component, wherein the first and third elements together with the plateau and the additional plateau form a guide bracket that is adapted to guide movement of the internally threaded fastener along the externally threaded shaft.

14. The power transmission system of claim 13, wherein the first joint transforms the second rotational movement into a first circular movement of the first element around the first joint, and wherein the second joint transforms the first circular movement of the first element into a second circular movement of the second element around the second joint.

15. The power transmission system of claim 14, wherein a first axis is in the same plane as the first element, perpendicular to the longitudinal extension of the externally threaded shaft and running through the first joint, wherein a second axis is in the same plane as the first element, perpendicular to the second element and running through the first joint, and wherein the first axis and the second axis define an angle that varies in response to the first circular movement.

16. The power transmission system of claim 15, wherein the first joint transmits a first force of the forces via the first element to the second joint at the angle.

17. The power transmission system of claim 16, wherein the angle is between 60° and 90°.

18. The power transmission system of claim 16, wherein the angle is between 30° and 60°.

19. The power transmission system of claim 13 further comprising:
a gearbox that generates the second rotational movement in response to the first rotational movement.

20. A helicopter comprising:
a fuselage;
an external load device connected to the fuselage via a component; and
a power transmission system adapted to transmit forces from a motor that generates a first rotational movement to the component, the power transmission system comprising:
an externally threaded shaft rotatably attached to the motor and capable of performing a second rotational movement;
an internally threaded fastener movably attached to the externally threaded shaft and capable of performing a movement along the externally threaded shaft in response to the second rotational movement;
a first element comprising:
a first end movably attached to the internally threaded fastener at a first joint, and
a second end; and
a second element comprising:
a plateau having a first end and a second end, the first end movably attached to the second end of the first element at a second joint to enable the first element to transmit the forces from the first joint to the second joint, and
the second end adapted to be rigidly attached to the component at a third joint to enable the plateau to transmit the forces from the second joint to the third joint by transforming a rotational movement of the second joint into a rotation of the component.

* * * * *